United States Patent [19]

Lawrenz et al.

[11] Patent Number: 4,983,704
[45] Date of Patent: Jan. 8, 1991

[54] HEAT-REACTIVE CROSSLINKING AGENT FOR SURFACE COATING BINDERS

[75] Inventors: Dirk Lawrenz, Ditzingen; Hans Schupp, Worms; Thomas Schwerzel, Ludwigshafen; Hans-Josef Oslowski; Ulrich Heimann, both of Muenster, all of Fed. Rep. of Germany

[73] Assignee: BASF Aktiengesellschaft, Ludwigshafen, Fed. Rep. of Germany

[21] Appl. No.: 378,795

[22] Filed: Jul. 12, 1989

[30] Foreign Application Priority Data

Jul. 19, 1988 [DE] Fed. Rep. of Germany ....... 3824416

[51] Int. Cl.$^5$ .............................................. C08G 18/54
[52] U.S. Cl. ........................................ 528/69; 528/73
[58] Field of Search .............................. 528/69, 73, 85

[56] References Cited

U.S. PATENT DOCUMENTS 4,369,290 1/1983 Evans et al. ......................... 525/137
4,721,758 1/1988 Schupp et al. ...................... 525/490

FOREIGN PATENT DOCUMENTS 0167029 1/1986 European Pat. Off. .

Primary Examiner—Maurice J. Welsh
Attorney, Agent, or Firm—Keil & Weinkauf

[57] ABSTRACT

Heat-reactive crosslinking agents for surface coating binders, based on phenolic Mannich bases, are obtainable by reacting
 (A) one equivalent of a polyphenol with
 (B) from 0.5 to 2 equivalents of formaldehyde or of a formaldehyde-donating compound and
 (C) from 0.5 to 1 equivalent of one or more secondary aliphatic amines,
removing the water of reaction and reacting the resulting reaction produce with
 (D) from 0.01 to 1 equivalent of a mono- and/or polyfunctional isocyanate compound.

9 Claims, No Drawings

HEAT-REACTIVE CROSSLINKING AGENT FOR SURFACE COATING BINDERS

The present invention relates to isocyanate-modified heat-reactive crosslinking agents, based on phenolic Mannich bases, for crosslinking surface coating binders. Crosslinking agents of this type are used mainly in cathodic electrocoating. The present invention also relates to coating materials which contain the crosslinking agent described, and articles which have been coated with such a coating material.

Heat-reactive crosslinking agents based on phenolic Mannich bases in conjunction with surface coating binders are known. For example, EP-A 167 029 describes a cathodic electrocoating binder which contains, as a crosslinking agent, a phenolic Mannich base prepared from (a) one or more polynuclear polyphenols,
(b) formaldehyde or a formaldehyde-donating compound and
(c) one or more secondary aliphatic amines.

The coating films produced generally afford good corrosion protection and have good leveling properties after baking. During the baking process, however, the phenomenon known as edgeput is observed, i.e. the surface tension causes the coating film to retract from the edges of the coated workpiece so that the resulting film thickness is inadequate and does not protect the edges sufficiently from corrosion.

It is an object of the present invention to provide heat-reactive crosslinking agents for surface coating binders, which crosslinking agents do not have the disadvantage described above. Surprisingly, this disadvantage could be overcome if the phenolic Mannich bases used as crosslinking agents were modified by reaction with mono- and/or polyisocyanates. The remaining performance characteristics could be kept at a high level.

We have found that this object is achieved by a heat-reactive crosslinking agent for surface coating binders which is based on phenolic Mannich bases, obtainable by reacting (A) one equivalent of a polynuclear polyphenol with
(B) from 0.5 to 2 equivalents of formaldehyde or of a formaldehyde-donating compound and
(C) from 0 5 to 1 equivalent of one or more secondary aliphatic amines, removing the water of reaction and reacting the resulting reaction product with (D) from 0.01 to 1 equivalent of a mono- or polyfunctional isocyanate compound.

The present invention furthermore relates to the use of these crosslinking agents for the preparation of heat-curable coatings, in particular those which are applied to electrically conductive substrates by cathodic electrocoating, and articles coated in this manner.

Regarding the individual components of the heatreactive crosslinking agent, the following may be stated:

Suitable polyphenols are compounds which have two or more phenol nuclei and whose molecule carries two or more hydrogen atoms ortho to various hydroxyl groups, for example compounds of the general formula I

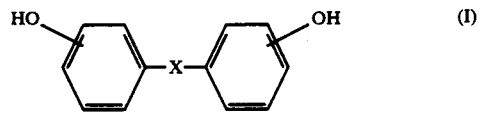

where the hydroxyl groups are in the ortho- or paraposition and X is an aliphatic alkylene group of 1 to 3 carbon atoms or —SO$_2$—, —SO—, —O— or —CH$_2$—NR—CH$_2$—, in which R is C$_1$-C$_{16}$-alkyl; a preferably used polyphenol of the general formula I is bisphenol A (2,2'-bis-(4-hydroxyphenyl)-propane).

Further suitable polyphenols are low molecular weight reaction products of phenols and formaldehyde, i.e. novolaks.

The polyphenols can also be produced in situ from monophenols and formaldehyde. Reaction products of polyphenols and polyepoxides may be used. Such a chainextending polyphenol can be prepared, for example, from 2 moles of bisphenol A and one mole of a diglycidyl ether obtained from bisphenol A and epichlorohydrin.

Formaldehyde or paraformaldehyde is used as component B).

Suitable secondary aliphatic amines (component C) are in principle all compounds of this type. However, amines which have a certain degree of volatility, i.e. those which have a boiling point below 250° C under 1,000 mbar, are preferred. Examples of particularly suitable amines are dialkylamines, such as dimethylamine, diethylamine, ethylpropylamine, dipropylamine, diisopropylamine, dibutylamine, diisobutylamine, dipentylamine or dihexylamine, dicyclohexylamine, morpholine and piperidine, and mixtures of these amines, as well as methylethanolamine and ethylethanolamine.

In principle, any mono- and/or polyfunctional isocyanates can be used as component D). The isocyanates may in turn contain other groups which do not lead to troublesome side reactions under the conditions of the reaction with the Mannich base. Semi-blocked diisocyanates, which initially react as monofunctional units, can also be used.

In addition to the abovementioned semi-blocked diisocyanates, it is also possible to use aliphatic and/or aromatic compounds, such as methyl isocyanate, phenyl isocyanate and cyclohexyl isocyanate, as monofunctional isocyanates.

Examples of suitable polyfunctional isocyanates are toluylene diisocyanate, hexamethylene diisocyanate, isophorone diisocyanate, trimethylhexamethylene diisocyanate, 4,4'-diphenylmethane diisocyanate, xylylene diisocyanate, trimerized hexamethylene diisocyanate, trimerized isophorone diisocyanate and derivatives of the aromatic diisocyanates which are hydrogenated in the nucleus. Suitable polyfunctional diisocyanates can also be prepared by reacting polyols or polyamines with low molecular weight polyisocyanates. Mixtures of polyfunctional isocyanates and/or mixtures of poly- and monofunctional isocyanates can also be used. Reaction products of isophorone diisocyanate or toluylene diisocyanate with trimethylolpropane and mixtures of these polyfunctional isocyanates with the corresponding diisocyanates, with hexamethylene diisocyanate or with diphenylmethane diisocyanate are preferably used.

Before the reaction with the isocyanates, the water of reaction formed during the preparation of the phenolic Mannich bases must be removed as completely as possible. This can be most simply done by azeotropic distillation using a suitable solvent, such as toluene.

The reaction conditions under which the phenolic hydroxyl groups and, where relevant, aliphatic hydroxyl groups are reacted with isocyanates, and any suitable catalysts concomitantly used, are familiar to the skilled worker and therefore need no further explanation.

The components are reacted with one another in amounts such that from 0.5 to 2, preferably from 0.8 to 1.2, equivalents of formaldehyde or of a formaldehydedonating compound (B), from 0.5 to 1, preferably from 0.8 to 1, equivalent of a secondary amine (C) and from 0.01 to 1, preferably from 0.1 to 1, particularly preferably from 0.2 to 0.5, equivalent of a mono- and/or polyisocyanate (D) are used per equivalent of the component (A).

The crosslinking agents can be used together with any surface coating binders which contain active hydrogen, suitable surface coating binders being described in, for example, EP-A 167 029.

If partially blocked di- or polyfunctional isocyanates have been used as component (D) for the preparation of the crosslinking agent, the latter can also be subjected to partial condensation with those groups of a coating resin which possess active hydrogen. A precondition here, however, is that the blocking component of the diisocyanate can be eliminated at a relatively low temperature, so that no crosslinking occurs via the aminomethyl groups. In this way, self-crosslinking resins are obtained. It is often useful here to choose the amine component (C) so that a crosslinking reaction via the aminomethyl group does not occur until substantially higher temperatures are reached.

Another method for obtaining self-crosslinking coating resins with crosslinking agents according to the invention is to react with the phenolic Mannich bases polyfunctional isocyanates whose isocyanate groups have different reactivities. Suitable diisocyanates here are 2,4-toluylene diisocyanate and isophorone diisocyanate. By means of suitable reaction conditions, the reaction with the phenolic Mannich bases can be controlled in such a way that initially only one of the two isocyanate groups reacts during the preparation of the crosslinking agent. The remaining isocyanate group can then be reacted in a further reaction step with suitable coating resins to give a self-crosslinking product.

If, for the use of the crosslinking agent for self-crosslinking coating resins, the amine component (C) of the phenolic Mannich base is chosen so that it is eliminated only at temperatures which are not reached under normal baking conditions, the crosslinking activity is lost and the modified phenolic Mannich bases then act merely as elastifying components.

For the preparation of an aqueous dispersion for cathodic electrocoating, an inorganic or organic acid, such as formic acid, acetic acid, lactic acid or phosphoric acid, is added to the mixture of the crosslinking agent and the surface coating binder, and the mixture is then diluted to the processing concentration. However, it is also possible to allow the mixture of crosslinking agent and surface coating binder to flow slowly into acidified water, while stirring.

For the preparation of cathodic electrocoating baths, other binders, pigments and further assistants and additives conventionally used in electrocoating, such as fillers, corrosion inhibitors, dispersants, antifoams, solvents or further resin components, may be added to the aqueous dispersion. The electrocoating baths usually have a solids content of from 5 to 30% by weight. Deposition is usually effected at from 15 to 40° C in the course of from 1 to 5 minutes at an applied voltage of from 50 to 500 volt. The electrically conductive article to be coated, for example a copper, aluminum or steel sheet which may have been chemically pretreated, e.g. phosphatized, is made the cathode. The deposited film can be cured at from 120 to 200° C, preferably from 130 to 180° C., in the course of from 5 to 45, preferably from 10 to 30, minutes.

EXAMPLES

Preparation of the crosslinking agents

Crosslinking agent A1

228 g of bisphenol A, 125 g of a diglycidyl ether of bisphenol A and 0.2 g of triphenylphosphine were heated at 160° C for 1 hour. After this time, epoxide could no longer be detected and a chain-extending diphenol was found to have been formed. 136 g of toluene, 172 g of dibutylamine and 45 g of paraformaldehyde were added and the mixture was heated at 80° C for 2 hours. After this time, the resulting water of reaction was distilled off azeotropically under slightly reduced pressure. The product had a solids content of 80% by weight. 38 g of trimerized hexamethylene diisocyanate (0.2 mole of NCO) and 0.5 g of dibutyltin dilaurate were added at 50-60° C. and the mixture was kept at this temperature for 2 hours. After this time, isocyanate was no longer detectable. The solids content was brought to 70% by weight with 112 g of toluene.

Crosslinking agent A2

680 g of a phenolic Mannich base according to Example A1 were further reacted with 19 g of trimerized hexamethylene diisocyanate (0.1 mole of NCO) and 0.5 g of dibutyltin dilaurate by the process stated in A1. The solids content was brought to 70% by weight with 103 g of toluene.

Crosslinking agent A3

680 g of a phenolic Mannich base according to Example A1 were further reacted with 158 g of phenyl isocyanate and 0.5 g of dibutyltin dilaurate by the process described in A1. The solids content was brought to 70% by weight with 163 g of toluene.

Crosslinking agent A4

228 g of bisphenol A were heated with 130 g of toluene, 258 g of dibutylamine and 70 g of paraformaldehyde at 80° C. for 2 hours. After this time, the resulting water of reaction was distilled off azeotropically under slightly reduced pressure. The product had a solids content of 80% by weight. 238 g of phenyl isocyanate and 0.5 g of dibutyltin dilaurate were added at 50-60° C. and the mixture was kept at this temperature for 2 hours. After this time, isocyanate was no longer detectable. The solids content was brought to 70% by weight with 195 g of toluene.

Crosslinking agent A5

650 g of a phenolic Mannich base according to Example A4 were further reacted with 112 g of hexamethylene diisocyanate and 0.5 g of dibutyltin dilaurate by the process stated in A1. The solids content was brought to 70% by weight with 140 g of toluene.

A crosslinking agent according to US-A 4,721,758, Example B5, was prepared as a Comparative Example. Use of the novel crosslinking agent in, for example, cathodic electrocoating.

A suitable coating resin was the coating resin described in EP-A 0 167 029, Example A1. Preparation of the electrocoating baths and application of the coating film were carried out in the manner described in the stated patent, the novel crosslinking agent being used as component B.

| Technical testing of the baked coating films | | | | | |
|---|---|---|---|---|---|
| Crosslinking agent | Leveling | Edge rusting after CCT | Erichsen cupping | Reverse impact | Solvent resistance |
| A1 | 2–3 | 0 | 8.7 | >80 | 1–2 |
| A2 | 2 | 0 | 8.3 | >80 | 1–2 |
| A3 | 1 | 2 | 8.5 | >80 | 1–2 |
| A4 | 1–2 | 0 | 8.2 | 60 | 2 |
| A5 | 2–3 | 0 | 8.4 | 80 | 1– |
| Comparison | 2 | 5 | 9.2 | >80 | 1–2 |

Rating: Leveling: Mark 1 = very good, Mark 2 = good, Mark 3 = adequate Edge rusting: Mark 0 = no edge rusting, Mark 5 = virtually complete underrusting below coating film CCT = Climatic cycling test according to Test Sheet VDA 621415 Solvent resistance: Mark 1 = not attacked Mark 2 = slightly attacked Rating after 100 double strokes with an acetone-impregnated cotton wool ball

We claim:

1. A heat-reactive crosslinking agent for surface coating binders which is based on a phenolic Mannich base, obtainable by reacting
   (A) one equivalent of a polyphenol with
   (B) from 0.5 to 2 equivalents of formaldehyde or of a formaldehyde-donating compound and
   (C) from 0.5 to 1 equivalent of one or more secondary aliphatic amines,
   removing the water of reaction and reacting the resulting reaction product with
   (D) from 0.01 to 1 equivalent of one or more compounds selected from the group consisting of the mono- and polyfunctional isocyanates.

2. A crosslinking agent as claimed in claim 1, obtainable by using an isocyanate compound D) which contains on average from 1 to 4 isocyanate groups per molecule.

3. A crosslinking agent as claimed in claim 1, obtainable by using trimerized hexamethylene diisocyanates as the isocyanate compound (D).

4. A process for the production of a heat-curable coating, wherein a reaction product as claimed in claim 1 is used as the crosslinking agent.

5. A process for the preparation of an electrocoating bath, wherein the said electrocoating bath contains a reaction product as claimed in claim 1 as a crosslinking agent, in addition to binders, further additives and coating assistants.

6. A coating material containing a crosslinking agent as claimed in claim 1.

7. A coating material containing further crosslinking agents in addition to the crosslinking agent as claimed in claim 1.

8. A coating material obtainable by partially reacting a crosslinking agent as claimed in claim 1 with a surface coating binder.

9. A coated article whose heat-cured coating has been produced using a crosslinking agent as claimed in claim 1.

* * * * *